United States Patent
Tammela

[19]

[11] Patent Number: 6,111,687
[45] Date of Patent: Aug. 29, 2000

[54] TRANSMITTING SUPERVISORY MESSAGES FROM A FIBER AMPLIFIER

[75] Inventor: Simo Tammela, Espoo, Finland

[73] Assignee: Nokia Telecommunications OY, Espoo, Finland

[21] Appl. No.: 09/051,370

[22] PCT Filed: Oct. 8, 1996

[86] PCT No.: PCT/FI96/00527

§ 371 Date: Apr. 9, 1998

§ 102(e) Date: Apr. 9, 1998

[87] PCT Pub. No.: WO97/14233

PCT Pub. Date: Apr. 17, 1997

[30] Foreign Application Priority Data

Oct. 9, 1995 [FI] Finland ................................ 954809

[51] Int. Cl.$^7$ ........................................................ H01S 3/00
[52] U.S. Cl. ............................................. 359/341; 359/177
[58] Field of Search ........................................ 359/341, 177

[56] References Cited

U.S. PATENT DOCUMENTS 5,383,046  1/1995  Tomofuji et al. .
5,436,760  7/1995  Nakabayashi .
5,625,481  4/1997  Tamura et al. ........................ 359/341 X

FOREIGN PATENT DOCUMENTS 669 730  3/1991  European Pat. Off. .
699 730  8/1995  European Pat. Off. .
674 403  9/1995  European Pat. Off. .
675 610 10/1995  European Pat. Off. .

OTHER PUBLICATIONS

"Optical Amplifiers and their Applications", edited by S. Shimada, et al., John Wiley & Sons, 1992.

*Primary Examiner*—Mark Hellner
*Attorney, Agent, or Firm*—Pillsbury Madison & Sutro

[57] ABSTRACT

The present invention is based on the idea that an optical band-pass filter (22) is employed in addition to its normal function for modulating a signal passing through the fiber amplifier on such a low frequency and amplitude that this modulation does not disturb the actual data transmission. This is realized in such a manner that the control signal of the band-pass filter (22), which is used in prior art fiber amplifiers only for optimizing the signal-to-noise ratio, for example, is used in the amplifier of the present invention for modulating the output signal of the fiber amplifier at the rate of a supervisory message.

18 Claims, 2 Drawing Sheets

TRANSMITTING SUPERVISORY MESSAGES FROM A FIBER AMPLIFIER

BACKGROUND OF THE INVENTION

The invention relates to data transmission between such amplifiers that use optical fiber as their data transmission channel.

A fiber amplifier is a device with which an optical signal can be amplified without converting the signal into an electrical signal in between. These amplifiers are used with very high transmission rates. A typical value of transmission rate may be 1 GHz, for example. The operation of a prior art fiber amplifier is illustrated in FIG. 1. In the figure the conductors transmitting optical signals are indicated with double lines and the conductors transmitting electrical signals are indicated with single lines. An input signal 1 of the amplifier is conducted via an optical isolator 12 to the second input of a wavelength combiner 14. The function of the optical isolator 12 is to attenuate reflections, for example. An input signal detector 16 after the optical isolator 12 detects the level of the input signal and generates an electrical signal corresponding to this level. A pump laser unit 18 supplies the second input of the wavelength combiner 14. The amplification of a signal operates in the following way. The pump laser 18 produces light whose wavelength is e.g. 980 or 1480 nm, whereas the wavelength of the signal light is 1,550 nm, for example. The photons of the pump laser 18 are conduced to an erbium-doped fiber 10 where they excite erbium atoms of the fiber 20. Some of the erbium atoms return to the ground state via spontaneous emission. When the photons of the signal light is directed to the erbium atom tuned by the photons of the pump laser, the erbium atom emits a photon corresponding to the photon of the signal light. The erbium-doped fiber 20 is followed by a band-pass filter 22 passing through the photons displaced by the photons of the signal light, but prevents the travel of the photons which are generated mostly by their spontaneous emission and whose wavelength is not similar to the wavelength of the signal light. An output signal 2 of the band-pass filter is an amplified optical signal transmitted to a (not shown) receiving station. Fiber amplifiers are discussed e.g. in *Optical amplifiers and their Applications,* edited by S. Shimada and H. Ishido, ©John Wiley & Sons, 1992.

Signal wavelength and characteristics of the band-pass filter 22 vary e.g. according to temperature or change considerably if some component of the system has to be replaced. In that case, the amplifier should be able to be adjust the pass wavelength of the band-pass filter by external, e.g. electrical control. Prior art arrangements comprise a controller 26 for this purpose. The controller 26 monitors the detector 16 of the input signal and a detector 24 of the output signal and amplifies the control signal of the band-pass filter 22 for maximizing the amplification of the amplifier or the correlation between the output and input signals.

As a fiber amplifier normally only amplifies a signal with a certain factor, without adding information to the signal, signalling associated with supervision and control of the amplifier generally has to be carried out with separate systems. This is a particular problem when using a so-called intermediate amplifier which is far (e.g. over 100 km) from both the transmitter and the receiver.

European Patent Application 415 438 discloses an art where supervisory messages are transmitted by modulating the control signal of a pump laser unit in such a manner that the excess amount of pumping light from the amplifier contains a supervisory signal to be transmitted. This prior art solution has, however, several limitations. First, the prior art solution is only applicable on a wavelength of 1,480 nm as the excess pumping light on a wavelength of 980 nm will be absorbed on a long data link by an information transmitting fiber. At the moment, it seems that the use of the wavelength of 1,480 nm is being abandoned as the wavelength of 980 nm produces better noise characteristics to the fiber amplifier and the total efficiency ratio of the amplifier will be better. Secondly, the prior art solution requires two separate optical systems, one for receiving a payload signal and one for receiving a supervisory signal. The reception of supervisory signals according to the prior art requires a separate WDM component (Wavelength Division Multiplexer). Thirdly, the prior art solution is only useable on such frequencies whose period is shorter than the lifetime of the fluorescence state.

BRIEF SUMMARY OF THE INVENTION

The object of the invention is thus to accomplish signalling related to the supervision of a fiber amplifier in such a manner that the problems associated with prior art can be solved. The object of the invention is achieved with the methods and systems which are characterized by what is stated in the independent claims.

The invention is based on the idea that the optical band-pass filter 22 is employed in addition to its normal function for modulating a signal passing through the fiber amplifier on such a low frequency and amplitude that this modulation does not disturb the actual data transmission. This is realized in such a manner that the control signal of the band-pass filter 22, which is used in prior art fiber amplifiers only for optimizing the signal-noise ratio, for example, is used in the amplifier of the invention for modulating the output signal of the fiber amplifier in the rate of the supervisory message.

A primary advantage of the method and system of the invention is that no separate signalling has to be arranged for supervising the amplifier. Another advantage is that changes required for the amplifier for realizing the invention are small. For example, the same optical components used for receiving a payload signal can be employed for receiving supervisory messages.

BRIEF DESCRIPTION OF THE SEVERAL VIEW OF THE DRAWING

The invention will now be explained in more detail by means of preferred embodiments with reference to the accompanying drawings, where FIG. 1 shows a block diagram of a fiber amplifier of prior art;

DETAILED DESCRIPTION OF THE INVENTION

Figure 1:
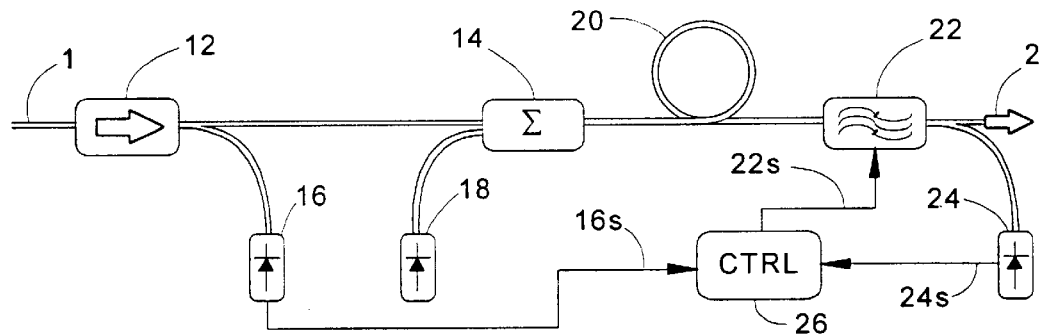
Figure 2:
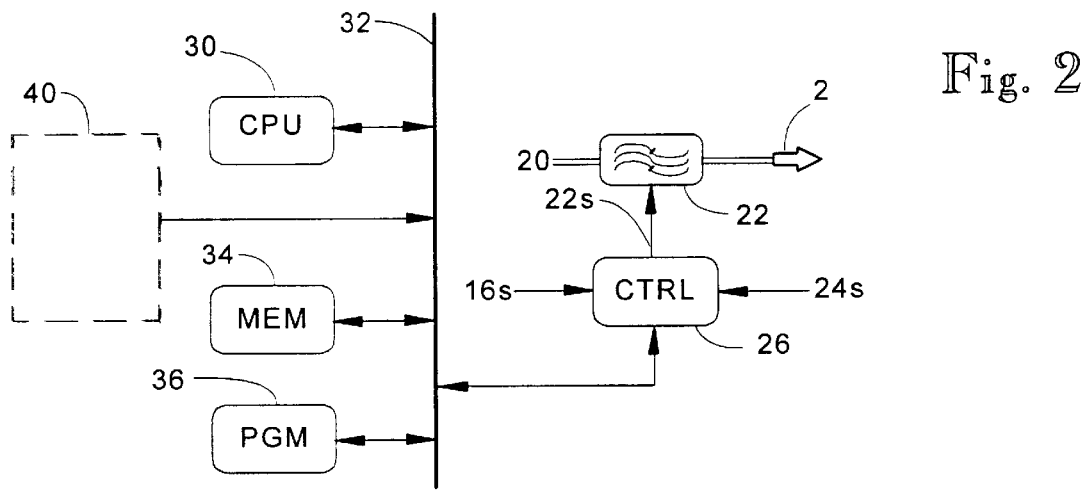
FIG. 2 shows a fiber amplifier completed in accordance with a basic embodiment of the invention.

FIG. 2 shows a fiber amplifier completed in accordance with a basic embodiment of the invention. All parts of FIG. 1 are also included in the embodiment shown in FIG. 2 although FIG. 2 only shows of them the controller 26 and the band-pass filter 22. In accordance with the invention, the controller 26 is controlled by a processor 30 whose structure can be a general-purpose computer, or a controller or the like integrated into one printed board or even into one chip. FIG. 2 is assumed to comprise all the accessories required by the processor, such as a system clock, bus buffers, etc. Of these accessories FIG. 2 shows only a read/write memory 34 and a program memory 36. The program memory 36 can be any memory in which the program is maintained during power failures, e.g. read only memory (ROM), flash memory or a hard disk. FIG. 2 shows a solution where the processor is connected to the controller 26 and the memories 34 to 36 via a system bus 32. A block 40 indicated in FIG. 2 comprises all the information the amplifier is to forward as supervisory messages. The two-way arrows connected to the system bus 32 describe an arrangement where the processor 30 has in use all the information of the controller 26 and the processor 30 may have an effect on the operation of the controller 26 and through it, on the operation of the band-pass filter 22. Similarly, information on the characteristics of the band-pass filter can be stored in the read/write memory 34 which can be accessed both from the processor 30 and the controller 26.

The block 40 comprises all the information that the amplifier is to forward as supervisory messages. This information may contain information on the opera-tion of the fiber amplifier, on conditions, the video signal obtained from a surveillance camera, etc. It is not essential for the invention what the supervisory messages contain but how the messages are transmitted.

In accordance with the invention, the processor 30 controls the controller 26 via the system bus 32 in such a manner that the controller 26 adjusts the control signal of the band-pass filter 22 for modulating the optical signal passing through the fiber amplifier on a low frequency and amplitude. A low amplitude here denotes that the modulation level is typically a couple of percentages and a low frequency denotes a frequency that is considerably lower than the frequency used by the fiber amplifier for the actual traffic.

When using a band-pass filter 22 for modulating an optical signal, particular attention should be paid to the accuracy of a control signal 22s. There are at least two reasons for this. First, the way the band-pass filter 22 allows an information transmitting optical signal to pass through is not a monotonous function for the control signal 22s, but this function has its peak at a specific value of the control signal. Secondly, the spontaneous emission explained in FIG. 1, which is noise for the receiver, is within the same band as the wavelength of the signal light.

The following shows one arrangement for calibrating amplitude modulation in a fiber amplifier of FIG. 2. It is assumed that the fiber amplifier transmits and amplifies the optical signal continuously. (i) The control signal 22s of the band-pass filter is set to its minimum value. (ii) The control signal 22s of the band-pass filter is magnified in small steps until the ratio of the output signal of the fiber amplifier to the input signal 16s reaches its maximum point and the value of this control signal 22s is stored in the read/write memory (RAM) 34. This value of the control signal 22s is indicated by $S_0$. (iii) The value of the control signal 22s is altered until the ratio of the output signal of the fiber amplifier to the input signal 16s is reduced from the peak value measured in step (ii) to a desired modulation level, for example 2 to 3%, and the obtained value of the control signal 22s is stored in the RAM 34. This value of the control signal 22s is indicated by $S_1$. When the value of the control signal 22s is altered in step (iii), the one that best attenuates the power of spontaneous emission is to be selected as the direction (up/down) of the alteration.

It was assumed above that the fiber amplifier transmits an optical signal continuously. If the optical conductor passing through the fiber amplifier does not transmit a payload signal, it can transmit null characters. If these null characters are not used, the calibration program of the processor is to be contain a step where it is detected that the optical signal is not present at all and then calibration is not attempted.

When the equipment of the invention is formed in the fiber amplifier for transmitting supervisory messages, this equipment can be used for adjusting the band-pass filter 22 essential even in the normal operation of the fiber amplifier. The calibration program stored in the program memory 36 can be made responsive to condition information, especially to temperature information, obtainable from a data acquisition block 40. It depends on the characteristics and the expected installation site of the band-pass filter if condition information is to be supplemented by air pressure and/or relative humidity. Also, the calibration program stored in the program memory 36 can be activated by an external command transmitted via the optical fiber. In that case, the fiber amplifier is to be connected to a detector to be described below in FIG. 5 and also, the signals have to be assembled into frames and in this case, the fiber amplifier whose band-pass filter is to be calibrated is to be indicated as the receiver.

Calibration can alternatively be carried out continuously in such a manner that calibration is performed for example once every minute or whenever the fiber amplifier is not transmitting supervisory messages. Calibration does not prevent or disturb the normal operation of the fiber amplifier. Then null characters, such as frames whose number of data bytes is zero, have to be transmitted for calibration.

The other parts of the fiber amplifier of the invention are considered to be known to persons skilled in the art. The critical component is the electrically controllable band-pass filter 22 whose essential parameters for the invention are stability and settling time. Suitable band-pass filters are manufactured e.g. by Queensgate Instruments Ltd in Berkshire, England.

When the band-pass filter 22 is calibrated as described above, it can be used for modulating an optical signal in the following way, wherein reference is made to FIG. 4. For the sake of simplicity, it is assumed that supervisory messages are transmitted in binary 0 and 1 states, in which case the presence of amplitude modulation corresponds to state 1 and its absence to state 0. Time T corresponding to one bit of a supervisory message is divided into four periods T1 to T4. A binary 1 state pulse is transmitted in the following way:

period T1: the value of the control signal 22s is S0,
period T2: the value of the control signal 22s is S1,
period T3: the value of the control signal 22s is S0.
period T4: the value of the control signal 22s is S1.

Binary 0 state pulse is transmitted otherwise in the same way as the 1 state pulse but in period T2 the value of the control signal 22s is also S0, that is, the amplitude is the same as in periods T1 and T3. It should be noted that the frequency of the optical signal in FIG. 4 is drawn considerably smaller than in reality in relation to the frequency of amplitude modulation. In reality thousands or millions of optical signal 2 periods fit into one amplitude modulation sequence. Furthermore, the modulation level is drawn considerably larger than the optimal value for the sake of illustration.

Figure 4:
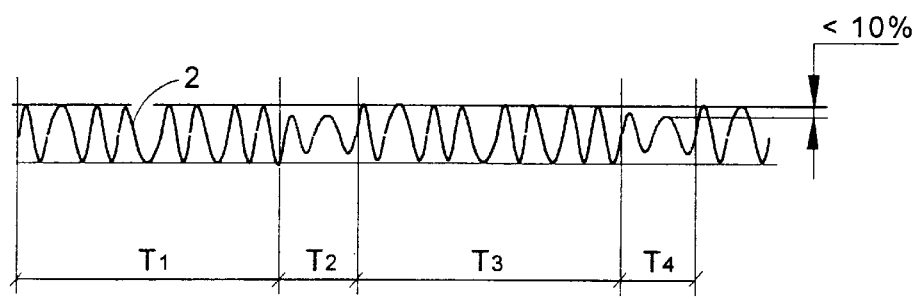
FIG. 4 shows amplitude modulation of an output signal of the fiber amplifier.

The above modulation method explained in connection with FIG. 4 is known per se and it is called Frequency Shift Keying (FSK). In short, in the FSK clock pulses are continuously sent at specific intervals (in periods T4). If there is a data pulse between two clock pulses (in period T2), this is interpreted as binary 1, otherwise as binary 0. An advantage of the FSK is that it is simple to implement, but a disadvantage is its slow transmission rate as each 1 state data requires four changes to the amplitude modulation state. It is also evident that on the basis of the above explanation, the invention can also be used with more advanced modulation methods.

Figure 5:
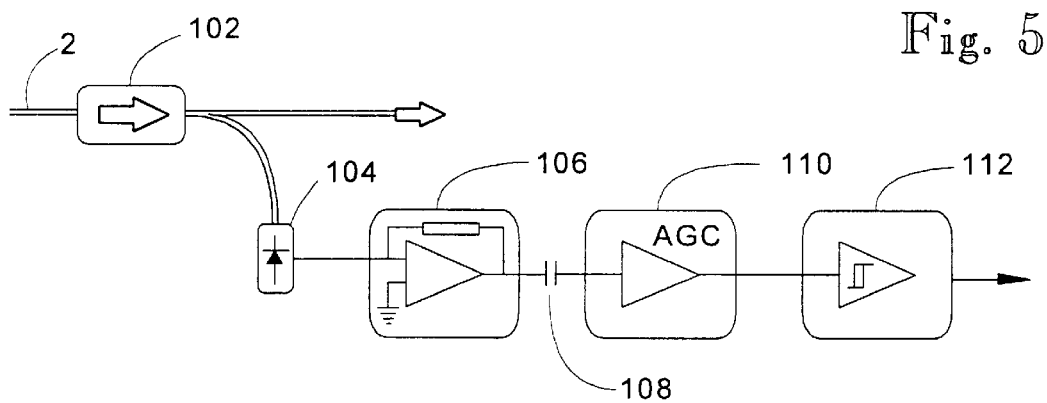
FIG. 5 shows one method for detecting supervisory messages.

FIG. 5 shows as a block diagram how supervisory messages can be indicated in a receiving station, of which other parts are not shown. The output signal 2 of the fiber amplifier according to FIG. 2 is received at a receiving station. The optical signal is processed after an optical isolator located there for normal telecommunication in an ordinary way. For detecting supervisory messages of the invention, the optical signal is converted into an electrical signal by a detector 104. The signal of the detector 104 is conducted to a transimpedance amplifier 106. This utilizes the fact that the frequency used by the fiber amplifier for the actual traffic is approximately 100,000 times greater than the frequency of supervisory messages. The detector 104 and/or transimpedance amplifier 106 realized with ordinary components allow only the frequency band of supervisory message (typically some tens of kilohertz) to pass through. A DC component is removed from the input signal of the transimpedance amplifier 106 by a capacitor 108 after which the signal is coupled to an automatically adjustable amplifier 110 and therefrom to a threshold value detector 112. The output signal of the threshold value detector 112 is "1" when a pulse is present in the signal transmitting the supervisory message and otherwise "0". The output signal of the detector 112 can be converted in parallel either by such series-to-parallel converters that are used in modems and disk drives or, alternatively, by a computer program.

Figure 3:
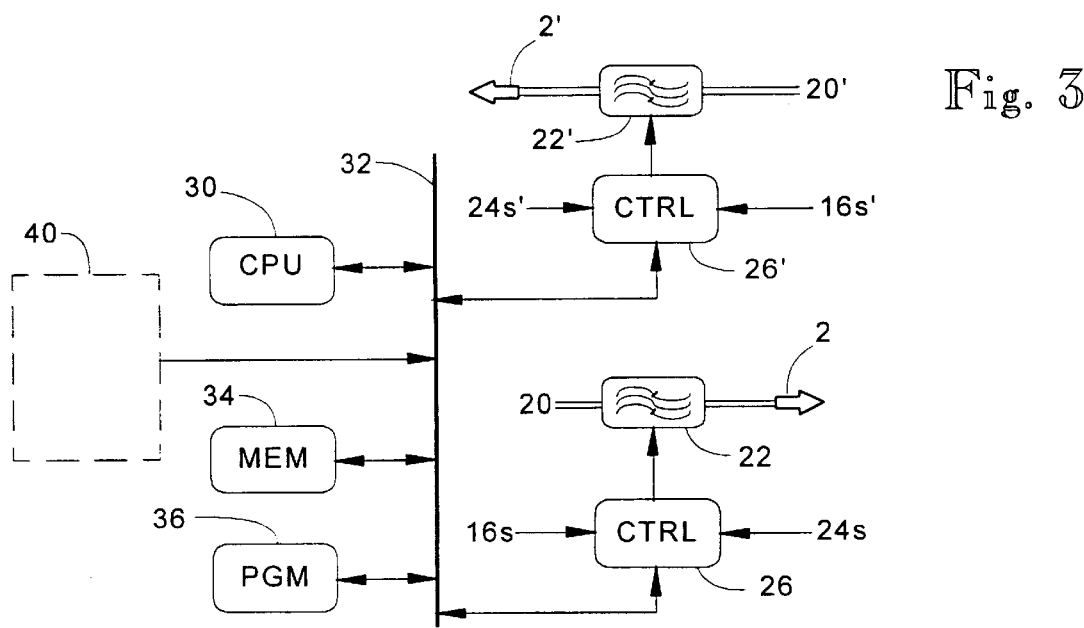
FIG. 3 shows an amplifier station comprising two fiber amplifiers completed in accordance with the invention.

The circuit of FIG. 2 can transmit supervisory messages to the receiver of an optical signal but not to its sender. FIG. 3 shows how the arrangement of the invention is applied to the two-way transmission of supervisory messages. In view of FIG. 2, the circuit of FIG. 3 is supplemented by another fiber amplifier of FIG. 1 for operation in the opposite direction. Operation in one way is called outgoing direction and in the other way return direction. The components in the outgoing direction in FIG. 3 are similar to those in FIG. 2. The components in the return direction are indicated with apostrophes. The supervisory messages to be returned are in this case obtained from the detector 16' of the input signal in the return direction, which is not shown separately.

In the transmission of supervisory messages of fiber amplifiers of the invention, special steps should be taken to ensure that the information to be transmitted is error-free. There are several reasons for this; for example, the fact that especially fiber amplifiers used as intermediate amplifiers can be a long distance from the preceding or next stations, whereby an unnecessary maintenance call caused by an erroneous message can be very costly. Another reason is that a compromise has to be made between noise-free messages and the actual operation of the amplifier. The error-free transmission of supervisory messages is improved by magnifying the modulation level. On the other hand, a high modulation level causes problems to the actual operation of the fiber amplifier. An advantageous compromise is brought about in such a manner that the modulation level used in transmitting supervisory messages is relatively low, less than 10% and an effective error-correcting code is used for transmitting supervisory messages. The excess information required by error correction is not generally a problem as the information content of supervisory messages is generally small. An exception to this is a situation where the transmission of supervisory messages of the invention is used e.g. for transmitting a video signal of a surveillance camera. It is generally possible to transmit signals of this kind without error correction.

When there is only one intermediate amplifier between a transmitter and a receiver, it is clear that supervisory messages are sent from this intermediate amplifier. If there are several successive intermediate amplifiers, the low modulation level of supervisory messages can disappear under the great amplification of the next intermediate amplifier. In that case, the safest way to operate is to assemble the supervisory messages into frames containing the identifiers of the sender and the receiver of the message. These frames are detected in the next intermediate amplifier and they are forwarded, as well as the specified signals of the next intermediate amplifier, whereby the original sender of the message is naturally set as the sender of the frame. In this case, the intermediate amplifier operates in the case of supervisory messages in the way that is largely analogous to bridges used in local area networks. The frames of supervisory messages can also be simplified in such a manner that the receiver is not specifically indicated by the receiver is always the last station in the chain.

An embodiment of the invention was explained in connection with FIGS. 2 and 3 where a program for transmitting supervisory messages is stored in a program memory 36. It is also possible, of course, to store in the program memory 36 a certain basic software that can be converted and complemented by means of data transmitted as supervisory messages. In that case, a detector explained in connection with FIG. 5 should be added to the fiber amplifier for the received supervisory messages. The program memory 36 should be complemented so that the fiber amplifier detects e.g. from the header fields of the frame that the receiver is the fiber amplifier in question and its program memory. The altered parameters or the parts of the program are stored in the read/write memory 34 and they replace the corresponding parts in the program memory 36.

It is evident for those skilled in the art that as the art develops, the basic idea of the invention can be realized in many ways. The invention and its embodiments are thus not restricted to the examples described above, but they can vary within the scope of the claims.

What is claimed is:

1. A method for transmitting a supervisory message from a fiber amplifier transmitting an optical signal, the fiber amplifier comprising a band-pass filter responsive to an external control signal, the method comprising the steps of:

determining calibration information indicating optical pass characteristics of the band-pass filter in response to the external control signal of the band-pass filter;

forming a modulation signal corresponding to the supervisory message and the calibration information;

combining the modulation signal and the external control signal of the band-pass filter to form a combined control signal; and amplitude modulating the optical signal of the fiber amplifier based on the combined control signal.

2. A method according to claim 1, the calibration information is determined at predetermined time intervals.

3. A method according to claim 1, wherein the modulation level is in the range of 2 to 10%.

4. A method according to claim 1, wherein the supervisory message is encoded into a digital form.

5. A method according to claim 4, wherein error detection coding is used in the digital coding of the supervisory message.

6. A method according to claim 4, wherein error correcting coding is used in the digital coding of a supervisory message.

7. A method according to claim 4, wherein the supervisory message is assembled into frames comprising an identifier of a sender.

8. A method according to claim 7, further comprising forwarding a received and coded supervisory message, the forwarding step comprising:

receiving the supervisory message and defining the identifier of an original sender contained therein; and re-transmitting the supervisory message, such that the identifier of the sender is the identifier of the original sender of the supervisory message.

9. A method according to claim 8, wherein the supervisory message is intended for a receiver and the frames also contain the identifier of the receiver.

10. A method according to claim 7, wherein the supervisory message is intended for a receiver and the frames also contain the identifier of the receiver.

11. A method according to claim 1 in an amplifier station comprising two fiber amplifiers, one for an outgoing direction and the other for a return direction, wherein the control signal of the band-pass filter for the return direction is controlled in the modulating step.

12. A method according to claim 1 wherein the fiber amplifier has a signal input at which the optical signal has an input signal value, the band-pass filter has a signal output at which the optical signal has an output signal value, the ratio of the output signal value to the input signal value has a maximum value when the band-pass filter is controlled by a control signal having a given value, and the combined control signal has one value which causes the ratio to have a value less than the maximum value.

13. A system for transmitting a supervisory message from a fiber amplifier transmitting an optical signal, the fiber amplifier comprising a band-pass filter responsive to an external control signal, the system comprising:

memory means for storing program code, supervisory messages and calibration information indicating optical pass characteristics of the band-pass filter in response to the control signal of the band-pass filter;

means for defining a supervisory message and for forming a modulation signal corresponding to the supervisory message and the calibration information; and means for combining the modulation signal and the external control signal of the band-pass filter to form a combined control signal and for amplitude-modulating the optical signal of the fiber amplifier based on the combined control signal.

14. A system according to claim 13, further comprising means for controlling the band-pass filter in a return direction.

15. A system according to claim 13, wherein the memory means comprise a read-only memory for storing the program code and a read/write memory for storing the calibration information.

16. A system according to claim 13, further comprising means for receiving a supervisory message.

17. A system according to claim 14 wherein the fiber amplifier has a signal input at which the optical signal has an input signal value, the band-pass filter has a signal output at which the optical signal has an output signal value, the ratio of the output signal value to the input signal value has a maximum value when the band-pass filter is controlled by a control signal having a given value, and the combined control signal has one value which causes the ratio to have a value less than the maximum value.

18. A system for receiving supervisory messages in a first frequency band superimposed on an optical telecommunication signal of a fiber amplifier in a second frequency band, the system comprising:

first means for converting an optical signal of the fiber amplifier into an electrical signal;

a transimpedance amplifier operationally connected to the first means, for separating a supervisory message from a telecommunication signal, the transimpedance amplifier having component values such that the transimpedance amplifier only passes the first frequency band but not the second frequency band; and second means operationally connected to the transimpedance amplifier, for converting the supervisory message into a digital form.

* * * * *